United States Patent [19]

Paris et al.

[11] 3,948,100
[45] Apr. 6, 1976

[54] PROBE FOR MEASURING THE LEVEL OF A LIQUID

[75] Inventors: Marcel Paris, Manosque; Serge Poinsot, Pertuis, both of France

[73] Assignee: Commissariat a l'Energie Atomique, Paris, France

[22] Filed: Sept. 26, 1974

[21] Appl. No.: 509,630

[30] Foreign Application Priority Data
Oct. 5, 1973 France .............................. 73.35706
Nov. 29, 1973 France .............................. 73.42553

[52] U.S. Cl. .............. 73/290 R; 73/304 R; 336/183
[51] Int. Cl.² ........................................ G01F 23/28
[58] Field of Search ............. 73/290, 304 R, 304 C; 336/30, 183, 220

[56] References Cited
UNITED STATES PATENTS
1,693,898  12/1928  Horle ................................ 336/183
3,402,607  9/1968  Cambillard ........................ 73/304

*Primary Examiner*—S. Clement Swisher
*Attorney, Agent, or Firm*—Sughrue, Rothwell, Mion, Zinn and Macpeak

[57] ABSTRACT

A probe of the mutual inductance type with a linear response which is independent of temperature comprises a rigid support, two insulated cables disposed in interengaged relation and wound on the support, means for supplying one of the cables $C_1$ with alternating current having constant amplitude and frequency, means for measuring the voltage between the two extremities of the second cable $C_2$. A single resistor R is placed between the extremities of the cable $C_2$, the resistance value of the resistor and the value of the frequency f being determined so as to ensure that the variations in voltage measured between the extremities of the cable $C_2$ are reduced to zero in respect of any given level of liquid outside the probe.

9 Claims, 7 Drawing Figures

PROBE FOR MEASURING THE LEVEL OF A LIQUID

This invention relates to the measurement of level of paramagnetic liquids, in particular liquid alkali metals employed in nuclear reactor vessels, by means of a probe formed of two windings, the primary winding being supplied from an alternating-current voltage source and the secondary winding being connected to a voltmeter. The probe is immersed vertically in a vessel containing the liquid whose level is to be measured.

There are a number of known methods for measuring liquids which are based on various physical principles. The usual method involving the use of floats is unsuitable in the particular case of measurement of liquid-metal levels by reason of the potential danger of deposition of metallic oxide on the float which impairs the accuracy of measurement. Moreover, the presence of a mechanical transmission system for the displacement of the float which emerges from the measuring vessel makes it necessary to abandon any possibility of hermetic closure of the vessel which would have the effect of preventing such phenomena as oxidation of the metal and contamination of the atmosphere.

The use of a γ-ray source displaced within the vessel in order to measure the γ-ray absorption coefficient of the contents of this latter and consequently the level of liquid within the interior calls for costly radiation measurement equipment. It is also necessary in this case to adopt expedients for providing protection against radiation, thus preventing the universal application of this method.

The use of ultrasonic waves has also been proposed but it again proves necessary in this case to resort to the use of complicated equipment for the determination of the levels to be measured.

The principle of a level probe of the mutual inductance type is known and has already been proposed for the measurement of levels and yet no consideration has been given to the possibility of employing a single probe made up of two windings around one and the same support. Furthermore, the instruments of the prior art for the measurement of level by inductance indicated the level only in respect of a given temperature; this is a major disadvantage when the temperature is not known with accuracy and is not uniform along the probe.

For all these reasons, it is an advantage to be able to make use of a level detection apparatus of rugged design which is easy to use and can be inserted, for example, into a compartment provided within the vessel of a nuclear reactor in which it is desired to measure the level of liquid sodium, for example; it is also desirable to ensure that the windings forming the probe are readily accessible for repairs and inspection.

The present invention is directed to a device of this type, namely to a level-measuring probe which is easy to use, has high accuracy of response and provides an indication of level which is independent of the temperature of the liquid in which the probe is immersed.

This invention has for its object a liquid-measuring probe formed of two coupled inductors, wherein the voltage which is developed at the secondary of the transformer formed by the two windings constituting the two inductors and which is dependent on the level of the liquid (especially liquid sodium) outside the cylinder formed by the two inductors is independent of the temperatures of the probe and of the liquid.

In more exact terms, the invention is concerned with a liquid-measuring probe of the mutual inductance type with a linear response which is independent of temperature, wherein said probe comprises:

a rigid support $S_1$;

two insulated cables disposed in interengaged relation and wound on said rigid support $S_1$;

means for supplying one of the cables $C_1$ with alternating current having constant amplitude and frequency;

if necessary a glove finger surrounding the cables which are wound on their rigid support $S_1$;

means for measuring the voltage between the two extremities of the second cable $C_2$;

a resistor R placed between the two extremities of the cable $C_2$.

The probe is made up of two interengaged windings. One of the windings, namely the primary, is supplied with current having a frequency and amplitude which are maintained constant; the current within the primary produces an alternating field having a constant maximum amplitude; the other winding, namely the secondary, delivers a voltage which is a function of the coupling between the two windings. This voltage is measured by means of a voltmeter.

In the event that the probe is employed for the measurement of a level of sodium, it is an advantage to place said probe inside a glove finger which on the one hand produces an influence on the primary-secondary coupling but on the other hand protects the probe against the sodium; said glove finger comes into contact with the sodium, with the result that the probe is continuously accessible.

Apart from the glove finger, the level of sodium and the temperature have an influence on the coupling between the primary and the secondary. It can be demonstrated that the voltage delivered by the secondary is a linear function of the level of sodium which surrounds the glove finger in respect of a predetermined temperature. When the sodium level rises around the glove finger, the leakage flux between primary and secondary increases and the voltage induced at the terminals of the secondary consequently decreases. This property remains valid in the case of any paramagnetic liquid located outside the glove finger which constitutes the probe.

This arrangement of the two windings inside the glove finger has an advantage in that the electrical lead wires can readily be withdrawn without disassembling the glove finger, that is to say with the minimum degree of technical difficulty; moreover, the windings are never in contact with the liquid sodium.

In order to increase the strength of the probe, the primary and secondary windings are wound on a support of stainless steel, for example.

In a preferential embodiment of the invention, the level-measuring probe is characterized in that the rigid support $S_1$ is a member of cruciform cross-section in order to minimize the action of eddy currents which develop within said support. Generally speaking, it must be ensured that the surface area of the support is as small as possible in comparison with the cylindrical winding surface. The cruciform profile offers a double advantage in that it has a small surface area and endows the device with high strength.

Other shapes can also be employed such as, for example, a cylindrical support provided with longitudinal slots.

In one embodiment of the invention, the measuring probe is constituted by thermocoax cables made of a zirconium-copper core clad with stainless steel; the Curie points of the metals and alloys constituting the probe are located at a temperature below 100°C.

More generally, the material constituting the primary and secondary windings is chosen so as to have no magnetic transition within the operating temperature range.

In this manner, the level detector operates within the liquid sodium at a temperature either above or below the Curie point of the constituent elements; in the event that the temperature is higher than the Curie point, the materials constituting the windings are paramagnetic whereas they were ferromagnetic below the Curie point. This offers an advantage in that the variation in magnetic permeability as a function of temperature is smaller above the Curie point than below this latter.

In a preferential embodiment of the invention, the glove finger surrounding the cables wound on the two coils is of stainless steel.

In another preferential embodiment of the invention, the level-measuring probe is characterized in that the winding of the cable $C_2$ around the rigid support $S_1$ has at least twice as many turns as the winding of the cable $C_1$.

The sensitivity of the probe is enhanced by increasing the number of turns of the secondary winding with respect to the number of turns of the primary winding. In order to obtain good sensitivity, it is necessary for the same diameter of cable forming the primary and the secondary to ensure that the secondary has two to three times as many turns as the winding of the primary cable.

In accordance with the invention, the resistance R is chosen so as to ensure that the variations in voltage developed across the terminals of the secondary are reduced to zero in respect of any given level of liquid outside the probe.

The temperature has an influence on the primary-secondary coupling insofar as the resistivity of the materials which are present (including the resistivity of sodium outside the glove finger) increases with the temperature. This has the effect of reducing the intensity of the eddy currents which act in opposition to the field produced by the primary winding (these currents are in fact developed within the steel of the glove finger and within the sodium).

In consequence, the temperature rise is represented by an increase in the voltage delivered by the secondary (when said temperature rise takes place at constant level) since the leakage flux decreases when the temperature rises.

In order to make use of temperature compensation, it is advantageous to obtain prior to this temperature correction a system of straight parallel lines representing the difference in potential at the terminals of the winding $C_2$ as a function of the level of the liquid outside the glove finger. This parallelism of all the straight lines obtained at different temperatures can be obtained only in respect of certain values of frequency and intensity of the primary current and in respect of suitable shapes and structures of the materials which constitute the probe.

It is for this reason that a cruciform support has been chosen in accordance with the invention and that use is made of cables having a Curie point located at a temperature which is lower than 100°C.

In the case of a given level, the secondary constituted by the winding of the cable $C_2$ behaves as a generator in which the electromotive force increases with the temperature; it is also noted that its internal resistance (in other words the resistance of the coil which is formed by the cable $C_2$) also increases with the temperature; this phenomenon is employed for the purpose of achieving temperature compensation. By connecting a resistance R, there is established a current flow such that the increase in the voltage induced within the secondary is compensated by the voltage drop within the internal resistance of the probe.

One particularly important application of the invention is its use for the purpose of measuring the level of liquid sodium with which a nuclear reactor vessel is partially filled.

In order to secure freedom from variations in the value of the resistance R as a function of the frequency, the operation will be carried out at a predetermined frequency as will be explained in detail hereinafter.

Further properties and advantages of the invention will become apparent from the following description in which examples of construction are given by way of explanation without any limitation being implied, reference being made to the accompanying figures, wherein.

As has already been mentioned, the invention is directed to a probe which serves to measure the level of a substance (liquid sodium, for example), which is of rugged construction, is of minimum overall size and provides indications for measuring the level of liquid outside a glove finger surrounding the probe which are independent of the temperature of the environment.

Figure 1:
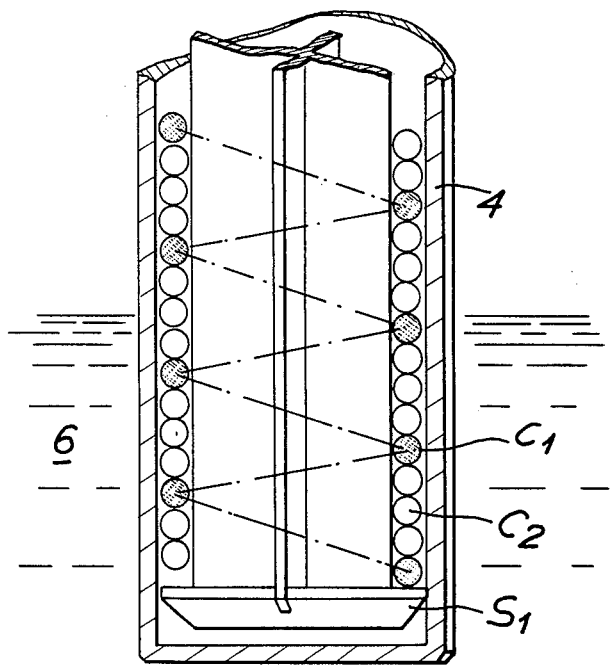
FIG. 1 is a diagram of the probe.

The measuring probe is shown in FIG. 1; the support $S_1$ around which are wound the cables $C_1$ and $C_2$ has a cruciform profile. The coil of the probe is constituted by two windings, namely a primary winding $C_1$ and a secondary winding $C_2$; in this example of construction, the secondary winding constituted by the cables $C_2$ has three times as many turns as the primary winding. The support $S_1$ which is surrounded by the cables is inserted into the interior of a glove finger 4, said glove finger being impermeable to the sodium 6 which surrounds this latter.

Figure 2:
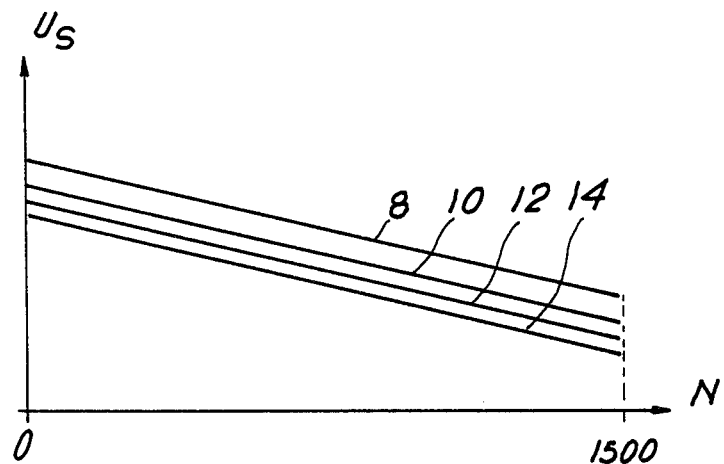
FIG. 2 shows the curves which give the difference in potential at the terminals of the secondary winding of the coil as a function of the level of liquid sodium in respect of different temperatures.

In FIG. 2, the curves indicating the potential difference $U_s$ in the secondary winding of the coil constituted by the cable $C_2$ have been plotted as ordinates as a function of the level N of liquid sodium outside the glove finger. Curve 8 has been plotted in respect of a temperature of liquid sodium of 550°C, curve 10 in respect of a temperature of 400°C, curve 12 in respect of a temperature of 300°C and curve 14 in respect of a temperature of 150°C. These curves are obtained without any correction resistance R. It is noted that said curves are parallel in respect of sodium levels which vary between 0 and 1500 mm in the example which has been chosen.

In this example, the frequency of the current supplied to the winding $C_1$ is 3500 c/s and the primary current is 100 mA.

Figure 3:
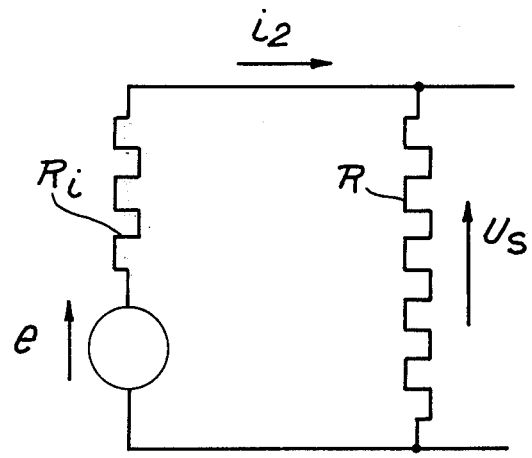
FIG. 3 is the circuit diagram constituted by the secondary winding of the coil and its different resistances.

There is shown in FIG. 3 a simplified circuit diagram constituted by the secondary winding of the transformer and comprising a potential source which delivers a voltage $e$ through the mutual inductance of the primary winding and the secondary winding, the resistance of the secondary winding constituted by the cable $C_2$ being designated as $R_i$ and the resistance R being connected between the two terminals of the secondary winding constituted by the cable $C_2$ of the coil. The current $i_2$ flows within the circuit and the voltage $U_s$ is measured at the terminals of the secondary winding.

Figure 5:
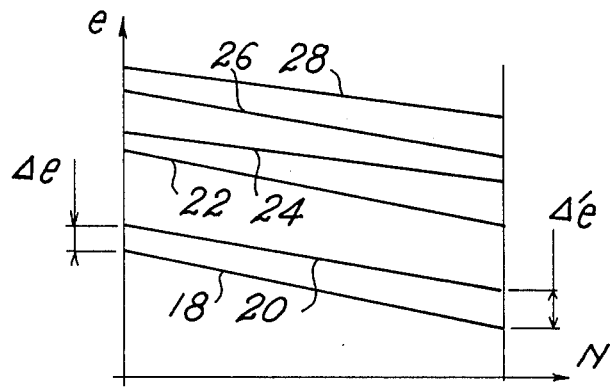
FIG. 5 shows the pairs of straight lines representing the value of the voltage $e$ at the terminals of the secondary winding as a function of the level N in respect of different values of frequency at two temperatures $T_1$ and $T_2$.

FIG. 5 shows the variations of the voltage $e$ at the terminals of the secondary winding of the probe as a function of the level N of sodium. The pair of straight lines 18 and 20 are both obtained in respect of a supply frequency of 3000 c/s, the pair of straight lines 22 and 24 are obtained in respect of a frequency of 3500 c/s, the pair of straight lines 26 and 26 are obtained in respect of a frequency of 4000 c/s. The straight lines 18, 22 and 26 are obtained at a temperature of $T_1 = 150°C$ and the straight lines 20, 24 and 28 are obtained at a temperature of $T_2 = 550°C$. The deviation $\Delta e$ is the variation in voltage $e$ at a frequency of 3000 c/s in respect of a variation in temperature of 400°C and in respect of a zero level, that is to say in the case of a non-immersed probe. The deviation $\Delta'e$ is the voltage deviation in the case of the same probe which is fully immersed.

Figure 6:
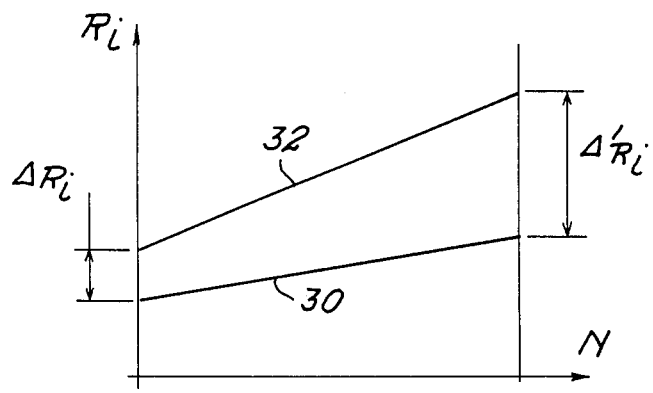
FIG. 6 shows the variations in internal resistance $R_i$ of the probe as a function of the sodium level N in respect of two values of temperatures $T_1$ and $T_2$.

FIG. 6 shows the variations in the internal resistance $R_i$ of the secondary winding of the probe as a function of the sodium level. The straight line 30 is plotted in the case of a temperature $T_1 = 150°C$ and the straight line 32 is plotted in the case of $T_2 = 550°C$.

Figure 7:
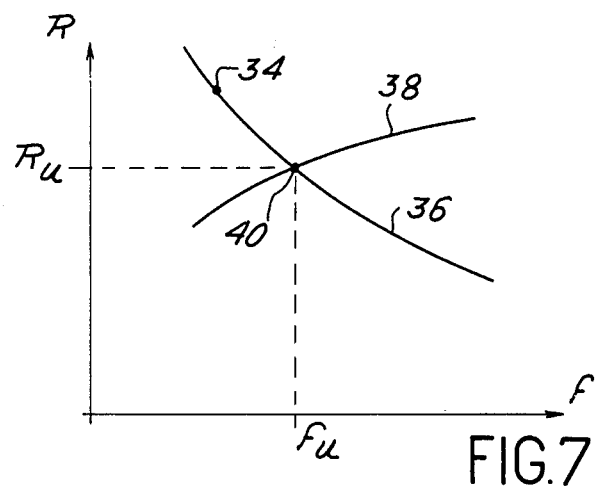
FIG. 7 shows the variations in the value of the resistance R as a function of the frequency F in respect of two extreme levels.

FIG. 7 shows the variations in the resistance R as a function of the frequency in respect of the zero level and the top level (immersed probe).

The following calculation establishes the value of the resistance R as a function of the characteristics of the circuit of the secondary winding. If we write the equation of the circuit of FIG. 4 in respect of a fixed level of sodium, we have:

$$U_s = R\, i_2 = R\, \frac{e}{R + R_i}$$

when the temperature varies, the voltage at the terminals of the resistance R of the secondary winding varies by the value $dU_s$:

$$dU_s = \frac{R}{R + R_i}\, de - \frac{e R}{(R + R_i)^2}\, dR_i$$

this voltage variation is reduced to zero or, in other words, we put $dU_s = 0$. To this end, it is only necessary to have:

$$(R + R_i)\, de - e\, dR_i = 0$$

there is thus chosen the following value of $R$:

$$R = e\, \frac{dR_i}{de} - R_i$$

This relation is valid at a predetermined frequency. In practice, in order to determine both the value of the frequency and the value of the resistance $R$, the procedure is as follows: the straight lines representing the variations in the voltage $e$ are plotted experimentally as a function of the level in respect of different frequencies and different temperatures (FIG. 5). There is then measured the deviation $\Delta e$ corresponding to a value $\Delta T = T_2 - T_1 = 400°C$ (zero level). By means of the curves of FIG. 6, a measurement is then taken of the variation $\Delta R_i$ corresponding to the same temperature difference in respect of the zero level. There are then known at a given frequency $e$ $R_i$, $\Delta e$, $\Delta R_i$, which makes it possible to calculate the value of $R$ in respect of the zero level, $$R = e\, \frac{\Delta R_i}{\Delta e} - R_i.$$

There is then obtained a point 34 of the curve 36 which represents the variations of $R$ as a function of the frequency in respect of the zero level.

The same procedure is adopted in the case of different values of frequency by means of the system of straight lines of FIG. 5; this makes it possible to obtain the curve 36, $R(f)$ in respect of the zero level and the curve 38, $R(f)$ in the case of the top level (immersed probe). The point of intersection 40 of these two curves has as abscissa the optimum frequency of utilization $f_u$ and the value of the corresponding resistance $R_u$.

The curves of FIG. 7 thus make it possible to choose the frequency of utilization and the value of the corresponding resistance R. The value of the voltage $U_s$ is then independent of the temperature within the range of utilization.

Figure 4:
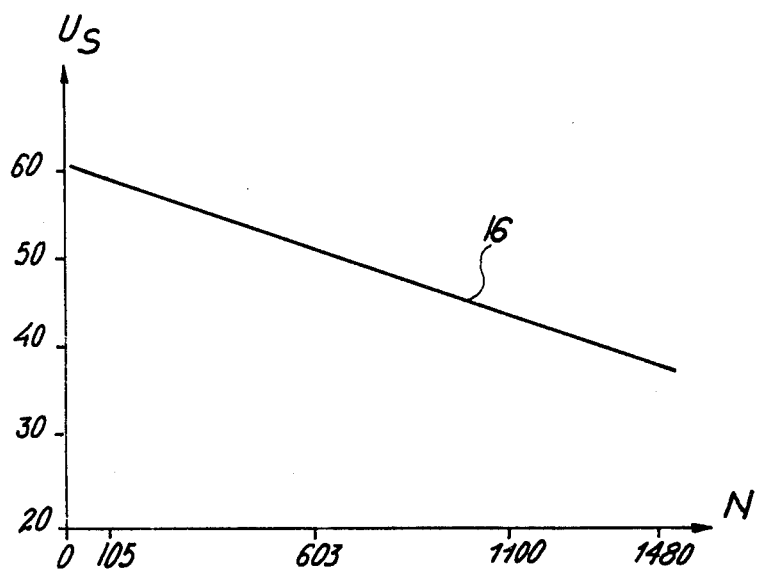
FIG. 4 shows the curve of the potential difference at the terminals of the secondary winding as a function of the sodium level; this curve is obtained after introduction of the resistance R.

This method has been successfully employed in a probe which has a single calibration line $U_s$ as a function of the level in respect of temperatures within the range of 150° to 550°C as indicated on curve 16 of FIG. 4. This straight line represents the variations in the voltage $U_s$ at the terminals of the resistance R as a function of the level of sodium in respect of temperatures within the range of 150° to 550°C. The voltage $U_s$ is indicated in mVolts and the level N is indicated in millimeters.

The values of various parameters corresponding to real measurements are indicated in the following table: 1500 mm probe of stainless steel.

| Slope in mV for 1500 mm | Primary current (Cable C$_1$) in mA | f in c/s | e (zero level) in mV | R in Ω |
|---|---|---|---|---|
| − 22.3 | 100 | 3700 | 40.1 | 479 |
| − 22.8 | 100 | 4000 | 74.3 | 479 |
| − 33.7 | 150 | 3800 | 106.4 | 464 |
| − 34.3 | 150 | 4100 | 110.5 | 464 |

In conclusion, there is thus provided in accordance with the invention a level-measuring probe of very simple and very rugged construction which permits particularly easy temperature compensation. These properties result in an inexpensive and reliable instrument.

What we claim is:

1. A probe for measuring the level of a liquid having a linear response which is independent of temperature and comprising:
   a rigid support S$_1$;
   two insulated cables disposed in interengaged relation and wound on said rigid support S$_1$;
   means for supplying one of the cables C$_1$ with alternating current having constant amplitude and frequency;
   means for measuring the voltage between the two extremities of the second cable C$_2$;
   wherein a single resistor R is placed between the extremities of the cable C$_2$, the value of said resistor and the value of the frequency f being so determined that the temperature-dependent variations of the voltage measured between the extremities of the cable C$_2$ are reduced to zero in respect of a given level of liquid outside the probe.

2. A level-measuring probe according to claim 1, wherein said cables are formed of a metal or alloy chosen so that the Curie point which may exist therein is outside the range of temperature contemplated for the measurement.

3. A level-measuring probe according to claim 2, wherein the Curie points of the metals and alloys which form the probe are present at temperatures below 100°C.

4. A level-measuring probe according to claim 3, wherein the cables constituting the windings are formed of thermocoax cables each made of a zirconium-copper core clad with stainless steel.

5. A level-measuring probe according to claim 1, wherein the rigid support S$_1$ is a sectional member having a cruciform profile.

6. A level-measuring probe according to claim 1, wherein a glove finger surrounds the cables which are wound on their rigid support S$_1$.

7. A level-measuring probe according to claim 1, wherein the winding of the cable C$_2$ around the rigid support S$_1$ has at least twice as many turns as the winding of the cable C$_1$.

8. A method of simultaneous determination of the resistance R and of the supply frequency f of the probe according to claim 1, wherein said method consists in establishing the arbitrary value of the supply current of the cable C$_1$, in measuring in respect of different values of the frequency and at least two values of the temperature of the external liquid the variations in voltage e between the extremities of the cable C$_2$ as a function of the level of liquid outside the probe, in measuring the value of the resistance R$_i$ of the cable C$_2$ in respect of different values of the temperature of the external liquid as a function of the level of said external liquid, in determining by means of these measurements the ratio $$\frac{\Delta Ri}{\Delta e}$$

of the variation in the resistance R$_i$ and of the variation in the voltage e, said variations being measured in respect of a same temperature deviation and a same level, wherein the formula $$R = e \frac{\Delta Ri}{\Delta e} - R_i$$

is employed to determine the resistance R as a function of the level and the frequency, wherein the values of utilization of the resistance R and of the supply frequency f are obtained by taking the point of intersection of two curves representing the variations in one case in the resistance R as a function of the frequency f in respect of a bottom level of the liquid outside the probe and in the other case in the resistance R as a function of the frequency f in the case of a top level of the liquid outside said probe.

9. An application of the level-measuring probe according to claim 1 to the measurement of the level of liquid sodium within a nuclear reactor vessel.

* * * * *